(12) United States Patent
Östling et al.

(10) Patent No.: US 6,736,027 B2
(45) Date of Patent: May 18, 2004

(54) ATTACHMENT DEVICE FOR ARRESTING A MACHINE MEMBER ON A SHAFT

(75) Inventors: Sture Östling, Katrineholm (SE); Uno Axelsson, Katrineholm (SE)

(73) Assignee: Aktiebolaget SKF, Gothenburg (SE)

( * ) Notice: Subject to any disclaimer, the term of this patent is extended or adjusted under 35 U.S.C. 154(b) by 15 days.

(21) Appl. No.: 10/127,548

(22) Filed: Apr. 23, 2002

(65) Prior Publication Data

US 2002/0152834 A1 Oct. 24, 2002

(30) Foreign Application Priority Data

Apr. 23, 2001 (SE) .............................................. 0101444

(51) Int. Cl.[7] ................................................. F16B 2/14
(52) U.S. Cl. ...................................... 74/578; 403/374.1
(58) Field of Search ............................ 74/578; 403/335, 403/336, 337, 338, 365, 366, 367, 368, 370, 373, 374.1, 374.2

(56) References Cited

U.S. PATENT DOCUMENTS

| | | | | |
|---|---|---|---|---|
| 3,565,471 A | * | 2/1971 | Nilsson | 403/369 |
| 4,268,185 A | * | 5/1981 | Mullenberg | 403/16 |
| 4,557,621 A | * | 12/1985 | Mullenberg | 403/16 |
| RE32,881 E | * | 2/1989 | Mullenberg | 403/16 |
| 5,639,176 A | * | 6/1997 | Mullenberg | 403/282 |
| 6,375,383 B1 | * | 4/2002 | Ostling et al. | 403/374.3 |

FOREIGN PATENT DOCUMENTS

| | | |
|---|---|---|
| DE | 84 14 085.6 U1 | 9/1985 |
| DE | 60-215120 A | 10/1985 |
| EP | 1 052 420 A1 | 11/2000 |

* cited by examiner

*Primary Examiner*—David A. Bucci
*Assistant Examiner*—Bradley J. Van Pelt
(74) *Attorney, Agent, or Firm*—Burns Doane Swecker & Mathis LLP

(57) ABSTRACT

An attachment device for a bore-provided machine member on a cylindrical shaft. A two-part sleeve is arranged in an annular space between the shaft and the machine member to provide a clamping force between the machine member and the shaft. The sleeve parts have mating cooperating taper surfaces that face each other so that upon mutual displacement of the sleeve parts the overall radial size of the sleeve parts changes. A first ring member is arranged about the shaft and forms a stop for one of the sleeve parts and a supporting device is adapted to move the machine member with respect to the shaft to cause mutual displacement of the sleeve parts. A second ring member positioned between the two-part sleeve and the machine member has a tapering bore, a tapering outer surface, and an inwardly projecting abutment for a second one of the sleeve parts.

14 Claims, 2 Drawing Sheets

ATTACHMENT DEVICE FOR ARRESTING A MACHINE MEMBER ON A SHAFT

This application is based on and claims priority under 35 U.S.C. §119 with respect to Swedish Application No. 0101444-8 filed on Apr. 23, 2001, the entire content of which is incorporated herein by reference.

FIELD OF THE INVENTION

The present invention generally relates to devices for arresting an element on a shaft. More particularly, the present invention pertains to an attachment mechanism intended for arresting a machine member, such as a pulley, a sheave, a sprocket or the like, on a cylindrical shaft.

BACKGROUND OF THE INVENTION

The mounting of elements such as sheaves, sprockets or the like on a cylindrical shaft so that the element is arrested against circumferential and/or axial movements relative to the shaft can be affected in different ways. One example is to provide a keyway in the shaft and/or in the boss or hub of the machine member, and a key inserted in the keyway for preventing relative circumferential movement. However, this arresting mechanism requires a more expensive machining of the keyway in the shaft, reduces the strength of the shaft and is not well suited to being used together with relatively light and inexpensive hollow shafts.

Similar limitations can be seen with use of threaded joints as this requires thread cutting of the shaft and inner surface of the bore in the machine member.

Cylindrical shaft and hub joints can also be obtained with a press fit affected with or without the use of a pressure oil arrangement. However, with these mechanisms, it is also difficult to use hollow shafts due to large radially inwardly directed forces.

Swedish Patent Application No. 9901711-3 discloses an attachment mechanism intended for arresting a machine member having a substantially cylindrical bore on a cylindrical shaft. The bore has a larger inner diameter than the outer diameter of the shaft to provide an annular space between the machine member and the shaft. In this space is inserted a pair of elements having mating, cooperating taper surfaces facing each other, with the elements being intended at mutual displacement to change their overall radial size, thereby increasing or reducing the clamping force between the machine member and the shaft. The elements are in the form of a first thin-walled sleeve member having a smooth inner surface arranged to enclose a portion of the shaft, and a second thin-walled sleeve member having a smooth outer surface arranged to engage the bore of the machine member, with the second sleeve member enclosing the first sleeve member. The first and second sleeve members in their surfaces that face each other have a plurality of saw-tooth-shaped consecutive axially tapering sections. In addition, one of the end edges of the second sleeve member abuts against a stop provided in the machine member, and the first sleeve member projects outside the opposite end edge of the second sleeve member for being readily accessible to receive an external pushing force causing such mutual displacement between the first and second sleeve members.

This generally described attachment mechanism is able to function relatively well, but suffers from the drawback that the size relationship between the shaft and bore of the sheave is very important for allowing proper attachment to be obtained. This makes it necessary to provide a substantial number of differently sized sleeve members.

FIG. 1 shows in cross-section an attachment device similar to that described above and disclosed in Swedish patent application No. 9901711-3. In this known device, a machine member 11 is secured to a portion of a hollow shaft 10. The machine member 11 is shown only partially and is in the form of a sheave. As shown, the hollow shaft 10 has a cylindrical external peripheral surface and the machine member 11 has an inner bore of cylindrical shape, with the inner diameter of the bore in the machine member 11 exceeding the outer diameter of the shaft 10. A shoulder 12 is provided at one axial side of the bore in the machine member 11. This shoulder 12 has a diameter slightly larger than the outer diameter of the shaft 10, thereby providing a clearance so that the machine member 11 can be easily pushed up the shaft 10 to a desired arresting position. The annular space 13 formed between the inner surface of the bore in the machine member 11 and the outer peripheral surface of the shaft 10 has a certain radial dimension x. In this space is inserted the primary part of the attachment mechanism which is in the form of the two-piece sleeve 15.

This two-piece sleeve 15 includes a first or inner sleeve piece 15a having a cylindrical inner surface and an external surface provided with a continuous axially arranged series of tapering, substantially saw-tooth-shaped surface elements, in which a first surface element b tapers from a larger diameter to a smaller diameter, followed by a consecutive second surface element c connected to the first surface element b via a substantially radial wall member d so that the end of the second surface element c adjacent the narrower end of the first surface element b has substantially the same outer diameter as that of the first surface element b at its largest end, i.e. at the end remote from the second surface element c. The second surface element c is related to and connected to the consecutive next surface element e in the same manner as the relationship between the first and second surface elements b, c, with this same relationship continuing along the length of the exterior surface of the inner sleeve piece.

The second or outer sleeve piece 15' of the two-piece sleeve is designed as a reverse image of the first inner sleeve piece 15a. Thus, the outer second sleeve piece 15' has a cylindrical outer peripheral surface and an inner surface provided with saw-tooth-shaped surface elements that are complementary to those of the first sleeve piece 15a. The outer second sleeve piece 15' is arranged to enclose the inner sleeve piece 15a, with a short section f of the inner sleeve 15a projecting axially beyond the interior of the outer second sleeve piece 15' as shown in FIG. 1.

This known attachment mechanism also incorporates a ring member 16 arranged around the shaft 10 on the side of the machine member 11 facing away from the shoulder 12. This ring member 16 is provided with a number of axially extending through-holes 16a, each of which receives a bolt 17 projecting through the through-hole 16a and screwed into a corresponding one of several threaded bores 18 in the machine member 11. This ring member 16 abuts the projecting sleeve portion f of the inner sleeve 15a. By tightening the bolts 17, it is possible to axially move the inner sleeve piece 15a relative to the outer sleeve piece 15' to cause the cooperating tapering surfaces of the inner and outer sleeve pieces 15a, 15' to slide against each other, thereby first reaching the radial measure x of the space 13, and thereafter upon continued tightening of the bolts increasing the grip between the attachment mechanism and the shaft 10 as well as between the attachment mechanism and the interior of the machine member 11 until a firm grip is obtained in the circumferential as well as in the axial direction.

By virtue of the consecutive saw-tooth-shaped taper portions being made in an integral unit, the attachment mechanism is centered in its seat without risk of misalignment. In addition, the handling and stock-keeping of the attachment mechanism is somewhat simplified.

The known attachment mechanism described above and illustrated in FIG. 1 provides very good and reliable attachment results. However, the arresting of sheaves of various bore diameters requires stock-keeping a large variety of sizes of the attachment mechanisms. Alternatively, this requires separate manufacture for different relationships between the bore and shaft diameter.

A need thus exists for an improved attachment mechanism of the type mentioned above which is not as susceptible to the drawbacks mentioned above, and which is useful for a wide variety of sheave bore diameters with only a few different sizes

SUMMARY OF THE INVENTION

One aspect of the invention involves an attachment device mounted with respect to a machine member and a cylindrical shaft to arrest the machine member on the shaft, wherein the machine member has a tapering bore of greater diameter than the outer diameter of the shaft so that an annular space exists between the machine member and the shaft. The attachment device includes a two-part sleeve positioned in the annular space to provide a clamping force between the shaft and the machine member, with the two-part sleeve comprising first and second sleeve parts. Each of the first and second sleeve parts has mating, cooperating taper surfaces facing each other so that upon mutual displacement the first and second sleeve parts change their overall radial size. A first ring member is arranged about the shaft and forms a stop for the first sleeve part. At least one bolt is positioned in a hole in the first ring member and in a bore in the machine member to move the machine member relative to the shaft and effect the mutual displacement of the first and second sleeve parts. A second ring member is positioned between the two-part sleeve and the machine member, and has a tapered outer surface that matches the taper of the bore in the machine member. The second ring member has an inwardly projecting flange located at the axial end of the second ring member which faces away from the first ring member, with the inwardly projecting flange forming an abutment for the second sleeve part to transfer axial displacement of the machine member into the mutual displacement of the first and second sleeve parts.

Another aspect involves an attachment unit adapted to be mounted about a cylindrical shaft to arrest a machine member, provided with a tapered bore of greater diameter than a diameter of the cylindrical shaft so that an annular space exists between the shaft and the machine member, on the cylindrical shaft. The attachment unit includes a two-part sleeve adapted to be positioned in the annular space to provide a clamping force between the shaft and the machine member, with the two-part sleeve comprising an inner sleeve part and an outer sleeve part encircling the inner sleeve part. The inner sleeve part and the outer sleeve part each have a first end and a second end, with the second end of the outer sleeve part extending axially beyond the second end of the inner sleeve part. The inner sleeve part has a cylindrical inner surface and an outer surface provided with a plurality of axially arranged taper surfaces, and the outer sleeve part has a cylindrical outer surface and an inner surface provided with a plurality of axially arranged taper surfaces. The taper surfaces on the inner sleeve part face the taper surfaces on the outer sleeve part to cooperate with each other so that mutual displacement of the inner and outer sleeve parts effects a change in overall radial size of the inner and outer sleeve parts. A first ring member is positioned adjacent the first end of the inner sleeve part and forms a stop for engaging the first end of the inner sleeve part. A supporting device is adapted to axially move the machine member with respect to the shaft to effect the mutual displacement of the inner and outer sleeve parts. A second ring member has an inner surface facing the outer surface of the outer sleeve part, and is provided with a tapering outer surface and an inwardly projecting flange located adjacent the second end of the outer sleeve part to form an abutment for the second end of the outer sleeve part to transfer an axial displacement of the machine member into the mutual displacement of the inner and outer sleeve parts.

The attachment device or unit is quite advantageous in that it is useful for a wide variety of sheave bore diameters with only a few different sizes.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 2:
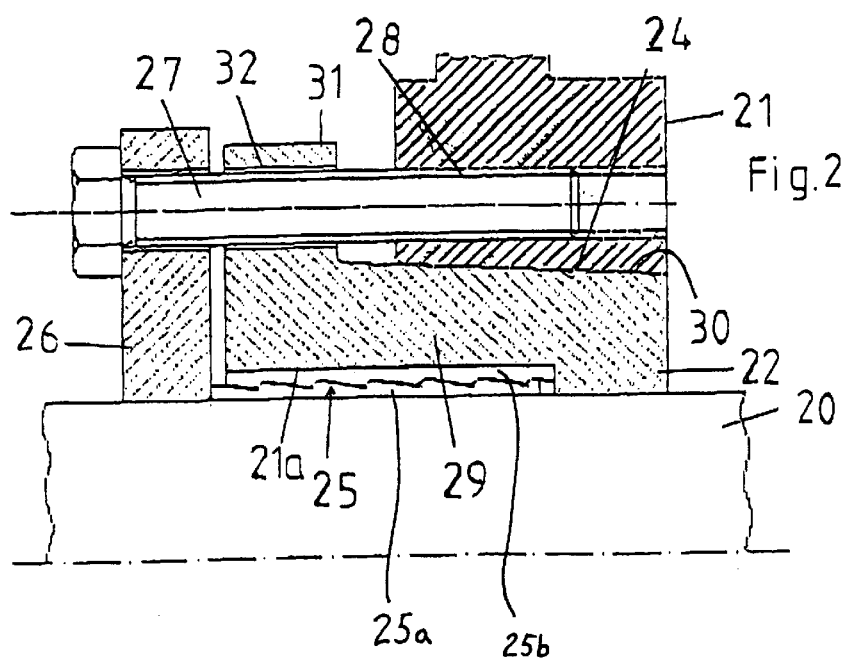
FIG. 2 is a cross-sectional view of a portion of a sheave attached to a shaft by way of an attachment device or attachment mechanism in accordance with the present invention.

FIG. 2 illustrates in cross-section a first embodiment of an attachment device or attachment unit according to the present invention. The attachment device includes a shaft 20, a machine member which in the illustrated embodiment is in the form of a sheave 21 (only a portion of which is shown), a first ring member 26 arranged around or encircling the shaft 20, and a plurality of supporting devices or bolts 27. Each of the bolts 27 extends through a bore or hole in the first ring member 26 and is screwed into a threaded bore or hole 28 in the machine member or sheave 21.

A two-part thin-walled sleeve 25 is positioned around and encircles the shaft 20. This two-part sleeve 25 is of the same construction as the two-part sleeve described above in connection with the illustration in FIG. 1. The two-part sleeve 25 comprises a first sleeve part 25a constituting an inner sleeve and a second sleeve part 25b constituting an outer sleeve part. The first sleeve part 25a has a cylindrical inner surface and an external surface provided with an axially arranged series of tapering substantially saw-tooth-shaped surface elements. The second sleeve part 25b has a cylindrical outer peripheral surface and an inner surface provided with an axially arranged series of tapering sawtooth-shaped surface elements that are complementary to those of the first sleeve part 25a. The second sleeve part 25b encloses or surrounds the first sleeve part 25b, with a short section of the inner sleeve part 25a at the end closest to the first ring member 26 projecting axially beyond the second sleeve part 25b as shown in FIG. 2. The first ring member 26 is arranged about the shaft 20 and forms a stop for the axial end of the inner sleeve part 25a.

Figure 1:
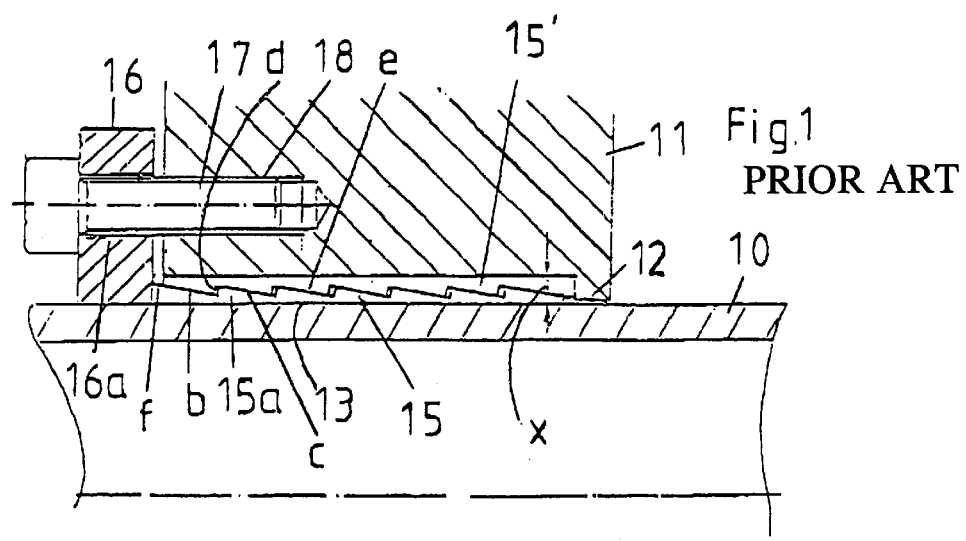
FIG. 1 is a cross-sectional view of a machine member arrested to a shaft by way of a known attachment mechanism.

The attachment mechanism used in FIG. 2 differs from that associated with the known version shown in FIG. 1 in that the bore 24 of the machine member 21 is tapered, rather than being cylindrical. In addition, an intermediately located second ring member 29 having an external tapering peripheral surface portion 30 is provided with a cylindrical inner surface 21a. This inner surface 21a of the second ring member 29, together with the outer peripheral surface of the shaft 20, defines a space in which the two-part sleeve member 25 is positioned.

One of the axial ends of the second ring member 29 has an inwardly projecting flange 22 forming an abutment for the outer sleeve part 25b. In the illustrated embodiment, the inwardly projecting flange 22 is located at the end of the second intermediately located ring member 29 that is remote from the first ring member 26. This inwardly projecting flange 22 has an inner diameter substantially corresponding to that of the shaft 20 to allow the second ring member 29 to be easily positioned around the shaft 20.

In this embodiment, one axial end of the second ring member 29 is provided with a radially outwardly projecting flange member 31. In this embodiment, the radially outwardly projecting flange member 31 is located at the axial end of the of the second ring member 29 located closer to the ring member 26. Thus, the inwardly projecting flange 22 and the outwardly projecting flange 31 are located at opposite axial ends of the second ring member 29. The outwardly projecting flange member 31 is provided with axially extending bores 32 aligned with or arranged to correspond in position to the bores in the first ring member 26 and the bores 28 in the machine member 21. Also, the flange 31 (i.e., the intermediate ring member 29) is relatively easily rotated in order to align the through bores 32 with the through bores in the first ring member 26 and in the machine member 21.

The operation and effect of the two-part sleeve member 25 shown in FIG. 2 is the same as that of the sleeve member 15 shown in FIG. 1 and described above. Thus, when the second intermediately located ring member 29 is applied with a substantially axial force to the left in FIG. 2, the second sleeve part 25b of the two-part sleeve 25 will be pushed to the left through contact with the adjacent shoulder formed by the inwardly extending flange 22 on the second ring member 29. However, the first sleeve part 25a of the two-part sleeve 25 will abut against the first ring member 26 and so the outer sleeve member will move up over the first sleeve part 25a, thus increasing the total radial size of the pair of sleeve members while also increasing the grip of the two-part sleeve 25 against the shaft 20 and against the second ring member 29. As a result, the force arresting the second ring member 29 on the shaft 20 is also increased.

Figure 3:
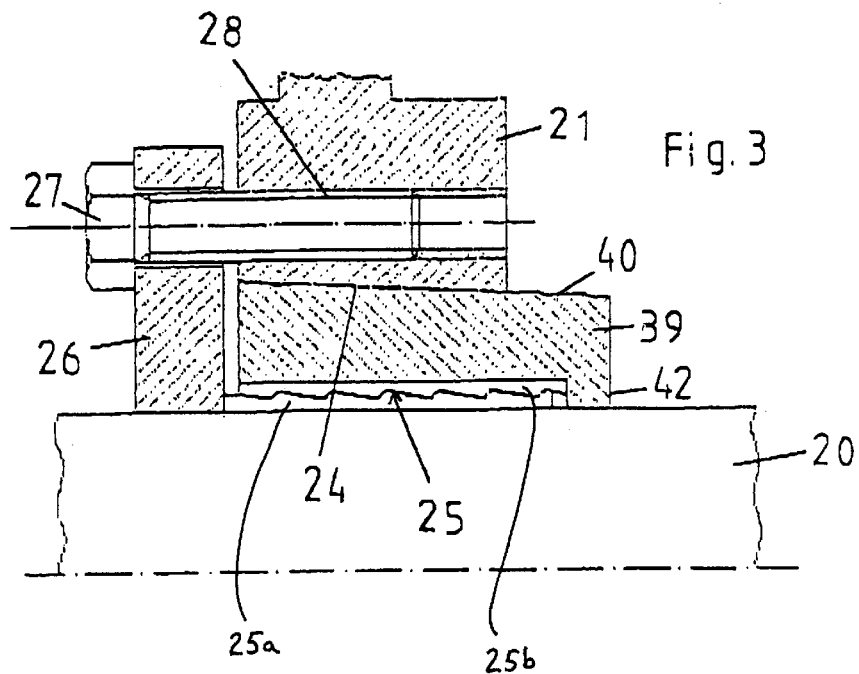
FIG. 3 is a cross-sectional view similar to FIG. 2, but illustrating a second embodiment of the attachment device according to the present invention.
Figure 4:
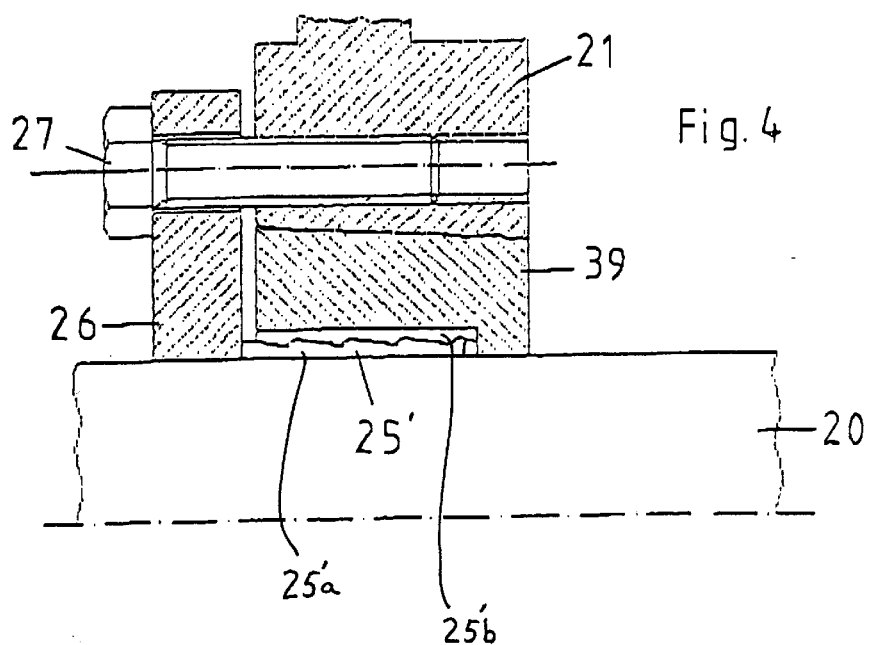
FIG. 4 is a cross-sectional view corresponding to FIG. 3 and showing an attachment device of a somewhat more compact design.

FIGS. 3 and 4 are cross-sectional views corresponding to the FIG. 2 illustration, but depicting attachment devices according to further embodiments of the present invention that are slightly different from the attachment device shown in FIG. 2. Components of these alternative embodiments that are the same as in the embodiment shown in FIG. 2 are designated by like reference numerals.

FIG. 3 illustrates a shaft 20 to which is attached an annular machine member 21 which in the illustrated version is in the form of a sheave. A two-part thin-walled sleeve 25 and a first ring member 26 are arranged about and encircle the shaft 20. The two-part sleeve is comprised of the inner sleeve part or first sleeve part 25a and the outer sleeve part or second sleeve part 25b. A plurality of bolts 27 extend through respective bores in the first ring member 26 and are threadably connected with corresponding threaded bores 28 in the machine member or sheave 21. The machine member 21 possesses a tapering bore 24. Positioned between the two-part sleeve 25 and the bore 24 of the machine member 21 is an intermediately located ring 39 which has a tapering outer peripheral surface 40 corresponding to the tapering bore 24 of the machine member 21. This intermediately located ring 39 has an inwardly projecting flange 42 closely encircling the periphery of the shaft 20, and thereby also forming an annular shoulder acting on the outer sleeve part 25b of the two-part sleeve 25 upon application of an axial force in the same manner as described above.

This second embodiment differs from the first embodiment shown in FIG. 2 insofar as the configuration of the intermediately located ring. In this second embodiment, the intermediately located ring 39 has no outwardly extending flange corresponding to the flange 31 in the first embodiment shown in FIG. 2. Rather, in the second embodiment shown in FIG. 3, the bolts 27 extend directly from the bores in the first ring member 26 and enter into the threaded bores 28 in the machine member or sheave 21. The functioning, effect and operation of the attachment device illustrated in FIG. 3 is are similar to those in the embodiment according to FIG. 2.

Referring to FIG. 4, a third embodiment of the present invention is illustrated which is similar to the embodiment shown in FIG. 3, except that the two-part thin-walled sleeve 25', comprised of the inner sleeve part or first sleeve part 25a' and the outer sleeve part or second sleeve part 25b', possesses a substantially shorter axial dimension than the corresponding dimension of the two-part sleeve shown in FIG. 3. Therefore, with this construction, it is also possible to use an intermediately located ring 39' that is of substantially sorter axial dimension. This shorter construction of the attachment device can preferably be used when the forces to be transferred between the shaft and the machine element (e.g., sheave) are relatively small.

In the embodiments according to FIGS. 3 and 4, the bolts 27 have no intermediate guidance via bores in a flange extending outwardly from the intermediary ring 39, 39'. For most applications, such intermediate guidance is not necessary.

The components forming part of the attachment device according to the invention can be temporarily interconnected and held together as a unit after manufacture and can be delivered to the place of use as a single unit. Upon assembly, the unit can be pushed up on the shaft to the desired position, whereupon the bolts are tightened until the grip between the different cooperating surfaces is as desired. A further advantage of this construction is that bolts and tapering portions of a standard type can be used.

It is to be understood that although the embodiments described above and illustrated in the drawing figures depict the machine member in the form of a sheave, the invention has application to other types of machine members. For example, the machine member can be in the form of a pulley, a sprocket or the like.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An attachment device mounted with respect to a machine member and a cylindrical shaft to arrest the machine member on the shaft, the machine member having a tapering bore of greater diameter than an outer diameter of the shaft, the attachment device comprising:

a two-part sleeve positioned about the shaft to provide a clamping force between the shaft and the machine member, the two-part sleeve comprising first and second sleeve parts;

each of the first and second sleeve parts having mating, cooperating taper surfaces facing each other so that upon mutual displacement the first and second sleeve parts change their overall radial size;

a first ring member arranged about the shaft and forming a stop for the first sleeve part;

at least one bolt positioned in a hole in the first ring member and in a bore in the machine member to move the machine member axially relative to the shaft and effect the mutual displacement of the first and second sleeve parts;

a second ring member positioned between the two-part sleeve and the machine member, the second ring member having an inner surface spaced from the shaft to provide an annular space in which is positioned the two-part sleeve;

the second ring member having a tapered outer surface that matches the taper of the bore in the machine member;

the second ring member having an inwardly projecting flange located at an axial end of the second ring member which faces away from the first ring member; and the inwardly projecting flange forming an abutment for the second sleeve part to transfer axial displacement of the machine member into the mutual displacement of the first and second sleeve parts.

2. The attachment device according to claim 1, wherein the at least one bolt passes through the hole in the first ring member and threadably engages the bore in the machine member.

3. The attachment device according to claim 1, wherein the at least one bolt passes through the hole in the first ring member and through a hole in the second ring member.

4. The attachment device according to claim 3, wherein the hole in the second ring member is formed in an outwardly projecting flange of the second ring member.

5. The attachment device according to claim 1, wherein the second ring member has an outwardly projecting flange provided with a through hole, the bore in the machine member being threaded, and the at least one bolt passing through the hole in the first ring member and through the hole in the second ring member and threadably engaging the threaded bore in the machine member.

6. The attachment device according to claim 5, wherein the outwardly projecting flange of the second ring member is positioned at an axial end of the second ring member that is opposite to the axial end at which is located the inwardly projecting flange.

7. The attachment device according to claim 1, wherein the machine member is a sheave.

8. An attachment unit adapted to be mounted about a cylindrical shaft to arrest a machine member, provided with a tapered bore of greater diameter than a diameter of the cylindrical shaft, on the cylindrical shaft, comprising:

a two-part sleeve adapted to be positioned around the shaft at a position between the shaft and the machine member to provide a clamping force between the shaft and the machine member, the two-part sleeve comprising an inner sleeve part and an outer sleeve part, the outer sleeve part encircling the inner sleeve part;

the inner sleeve part and the outer sleeve part each having a first end and a second end, the second end of the outer sleeve part extending axially beyond the second end of the inner sleeve part;

the inner sleeve part having a cylindrical inner surface and an outer surface provided with a plurality of axially arranged taper surfaces;

the outer sleeve part having a cylindrical outer surface and an inner surface provided with a plurality of axially arranged taper surfaces;

the taper surfaces on the inner sleeve part facing the taper surfaces on the outer sleeve part to cooperate with each other so that mutual displacement of the inner and outer sleeve parts effects a change in overall radial size of the inner and outer sleeve parts;

a first ring member positioned adjacent the first end of the inner sleeve part and forming a stop for engaging the first end of the inner sleeve part;

supporting means for axially moving the machine member with respect to the shaft to effect the mutual displacement of the inner and outer sleeve parts;

a second ring member having an inner surface facing the outer surface of the outer sleeve part;

the second ring member having a tapering outer surface and an inwardly projecting flange located adjacent the second end of the outer sleeve part to form an abutment for the second end of the outer sleeve part to transfer an axial displacement of the machine member into the mutual displacement of the inner and outer sleeve parts.

9. The attachment unit according to claim 8, wherein the supporting means includes at least one bolt passing through a hole in the first ring member and having a threaded portion adapted to threadably engages a threaded bore in the machine member.

10. The attachment unit according to claim 9, wherein the at least one bolt passes through the hole in the first ring member and through a hole in the second ring member.

11. The attachment unit according to claim 10, wherein the hole in the second ring member is formed in an outwardly projecting flange of the second ring member.

12. The attachment unit according to claim 11, wherein the outwardly projecting flange of the second ring member is positioned at an axial end of the second ring member that is opposite to the axial end at which is located the inwardly projecting flange.

13. The attachment unit according to claim 8, wherein the second ring member has an outwardly projecting flange provided with a through hole and the first ring member is provided with a through hole, the supporting means including at least one bolt passing through the hole in the first ring member and through the hole in the second ring member.

14. The attachment unit according to claim 8, wherein the supporting means includes at least one bolt positioned radially outwardly of the outer surface of the second ring member.

* * * * *